(12) United States Patent
Gallant et al.

(10) Patent No.: US 7,283,546 B2
(45) Date of Patent: Oct. 16, 2007

(54) SYSTEM SUPPORTING THE DYNAMIC MIGRATION OF TELECOMMUNICATION SUBSCRIBERS BETWEEN CALL SERVICES PROVIDERS

(75) Inventors: Jean-Francois Gallant, Ottawa (CA); John Donak, Kanata (CA)

(73) Assignee: Ciena Corporation, Linthicum, MD (US)

( * ) Notice: Subject to any disclaimer, the term of this patent is extended or adjusted under 35 U.S.C. 154(b) by 1048 days.

(21) Appl. No.: 10/452,796

(22) Filed: May 30, 2003

(65) Prior Publication Data
US 2004/0042509 A1 Mar. 4, 2004

(30) Foreign Application Priority Data
Aug. 30, 2002 (CA) .................................. 2400548

(51) Int. Cl.
*H04L 12/28* (2006.01)
(52) U.S. Cl. ...................... 370/401; 370/353; 370/352; 379/207.02
(58) Field of Classification Search .................... None
See application file for complete search history.

(56) References Cited

U.S. PATENT DOCUMENTS

| | | | |
|---|---|---|---|
| 5,430,719 A * | 7/1995 | Weisser, Jr. ................. | 370/389 |
| 6,118,768 A | 9/2000 | Bhatia et al. | |
| 6,353,621 B1 | 3/2002 | Boland et al. | |
| 6,779,030 B1 * | 8/2004 | Dugan et al. ............... | 709/223 |
| 2002/0075803 A1 * | 6/2002 | Zaharychuk et al. ........ | 370/231 |
| 2003/0161296 A1 * | 8/2003 | Butler et al. ................ | 370/352 |
| 2003/0185370 A1 * | 10/2003 | Rosera et al. .......... | 379/207.02 |

* cited by examiner

*Primary Examiner*—Duc Ho
(74) *Attorney, Agent, or Firm*—Merek, Blackman & Voorhees, LLC

(57) ABSTRACT

An access device enables dynamic migration of telecommunications subscribers between multiple transport networks and call services providers. The access device stores access patterns that associate a subscriber with a call server and define trigger events. The access device monitors the trigger events. The access device associates the subscriber with a different call server in accordance with the trigger events and the access patterns. The trigger events can be dynamic or static, can be on a line-by-line or call-by-call basis, and can be selected by a user or implemented by an operator. In this manner, the access device allows graceful migration of voice services from a legacy network to a next-generation packet network with lower capital and ownership costs.

28 Claims, 2 Drawing Sheets

SYSTEM SUPPORTING THE DYNAMIC MIGRATION OF TELECOMMUNICATION SUBSCRIBERS BETWEEN CALL SERVICES PROVIDERS

The present invention relates generally to telephone network access technology, and specifically to a system for enabling the dynamic migration of telecommunications subscribers between multiple transport networks and call services providers.

BACKGROUND OF THE INVENTION

In a telecommunication system, subscriber lines are generally connected to a Public Switched Telephone Network (PSTN) via access network devices. Typically, access devices include channel interfaces for terminating the subscriber lines and a network interface for connecting the access device to a local exchange switch of the PSTN. The PSTN is connected to the network device using one or more wide-band carrier links. The access device converts data between an analog signal used on subscriber lines and a digital signal typically used by the PSTN so data can be transported over the network. This conversion involves operations such as sampling and digitizing voice-band signal from each of the subscriber lines and aggregating the digitized signals from the plurality of lines into a single signal for transporting, so the information can be transported more efficiently on the wide-band carrier links.

Primarily, telecommunication systems have been implemented using time-division multiplexing (TDM) as the carrier technology of choice. TDM technology divides the available bandwidth into timeslots and assigns a predefined timeslot to each subscriber line. The subscriber line transmits its data to the network during its assigned timeslot. As such, existing access devices normally provide a TDM interface to the network in the form of T1 or T3 carrier links. However, as the amount of data traffic travelling over public packet networks outgrows voice traffic, new access devices have become available which provide connectivity to next-generation packet networks, thereby enabling call services to be provided over a packet network.

However, although a trend is developing towards next-generation packet network to provide voice communication, there are still many legacy systems that are reluctant to make such a switch. This reluctance is because packet network access devices are designed solely for packet network access. Thus, this limitation has left service providers with an obligation to keep and maintain legacy access equipment in parallel with next-generation access equipment, and follow a costly and inefficient migration path that requires physically moving subscriber lines from the legacy equipment to the packet-network access device. This difficulty discourages service providers from adopting next-generation packet networks, thereby delaying the introduction of new call services that a packet-based infrastructure would make possible.

Therefore, it is an object of the present invention to obviate or mitigate at least some of the above-mentioned disadvantages.

SUMMARY OF THE INVENTION

It is an advantage of the present invention that a single access device provides access to multiple transport networks and allows subscribers to migrate between transport networks on a line-by-line basis. Further, the convergence of multiple transport network technologies into a single access device presents opportunities for new services that require the capability to change the association between a subscriber line and call services provider on a call-by-call basis or even in mid-call. One such service automatically routes data modem calls over the packet network to reduce the load on the TDM network. Another service allows subscribers to switch to a different call service provider to take advantage of lower rates. Yet another service automatically switches a subscriber line to a different transport network upon failure or congestion of their usual network. Such service opportunities abound and can be facilitated by the invention, as will be appreciated by a person skilled in the art.

In accordance with an aspect of the present invention, there is provided an access device in a telecommunications network for coupling each of a plurality of subscriber loops to any of a plurality of transport networks. The access device comprises the following components. A plurality of line termination units couple the plurality of subscriber loops with the access device. A plurality of link adaptors couple the plurality of transport networks with the access device. A media switch selectively couples ones of the plurality of line termination units with ones of the link adaptors. A call control system controls the media switch for determining which of the plurality of line termination units is coupled with which of the link adaptors and for providing call control between the plurality of subscriber loops and their associated transport networks.

In accordance with yet a further aspect of the present invention, there is provided a method for allowing a subscriber to migrate between services, the subscriber being coupled with at least one transport network via an access device, the method comprising the steps of: storing at the access device an access pattern identifying a plurality of call servers, one of the call servers for providing initial service to the subscriber, the access pattern further defining trigger events; monitoring at the access device for the trigger events; and transferring control over the subscriber, upon detection of at least one of the trigger events, to a different one of the plurality of call servers in accordance with the detected trigger event and the access pattern.

BRIEF DESCRIPTION OF THE DRAWINGS

An embodiment of the invention will now be described by way of example only with reference to the following drawings in which.

DETAILED DESCRIPTION OF THE PREFERRED EMBODIMENTS

Figure 1:
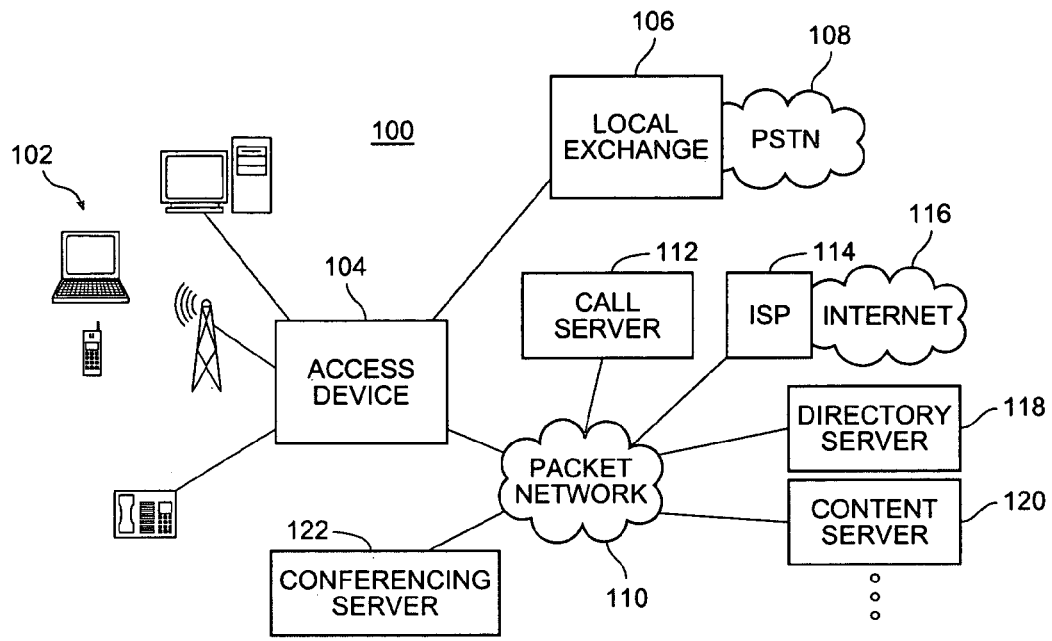
FIG. 1 is a block diagram of a network having an access device with multiple network interfaces.

For convenience, like numerals in the description refer to like structures in the drawings. Referring to FIG. 1, a telecommunication network is illustrated generally by numeral 100. The network 100 comprises a plurality of subscriber devices, or endpoints 102, an access device 104, a local exchange 106, a Public Switched Telephone Network (PSTN) 108, a packet network 110, a call server 112, an internet service provider (ISP) 114, the Internet 116, a directory server 118, a content server 120, and a conferencing server 122.

The endpoints 102 include Plain Old Telephone Service (POTS) devices, various formats of Digital Subscriber Loop (xDSL) devices, and wireless devices such as cellular telephones, personal digital assistants (PDAs), and notebook computers. The endpoints are coupled to an access device 104 in accordance with the type of endpoint. For example, POTS and xDSL devices are coupled to the access device 104 via a copper twisted-pair and wireless devices are coupled to the access device 104 via a wireless network. Such connections are known in the art and need not be described in detail. The access device 104 is coupled to the local exchange 106 via TDM links 105. The local exchange is, in turn, coupled to the PSTN 108. The access device 104 is further coupled to the packet network 110 via packet links 109. The packet network is coupled with the call server 112, conferencing server 122, ISP 114, directory server 118, content server 120, and the like as will be appreciated by a person skilled in the art. The ISP 114 is further coupled to the Internet 116, or other wide area network.

The access device 104 is capable of supporting multiple signaling protocols, which in the present embodiment includes both PSTN and packet network signals. This architecture allows subscribers to receive call services from the legacy PSTN network 108, concurrently with other subscribers on the same access device 104 receiving enhanced call services from the next-generation packet network 110. Interfaces on the access device 104 allow a service administrator to dynamically assign subscriber lines on a line-by-line basis to any available network, using the same access device.

Thus, the architecture enables the graceful migration of voice services from the legacy PSTN 108 to the next-generation packet network 110, which translates into multiple benefits for a service provider as well as a service subscriber. The architecture reduces capital and ownership costs of the access equipment, as this configuration reduces the need to retain and maintain dedicated legacy access equipment. Risks associated with the introduction of new enhanced voice services using packet network technology are reduced, as new services can initially be offered as a trial to small groups of customers and later deployed to a larger customer base. Further, early technology adopters can subscribe to enhanced services as they become available, thereby creating new revenue streams for the network operator, without the cost of an "all or nothing" migration of subscribers to the next generation network 110 as would occur if the operator had to purchase separate TDM and packet access devices.

Figure 2:
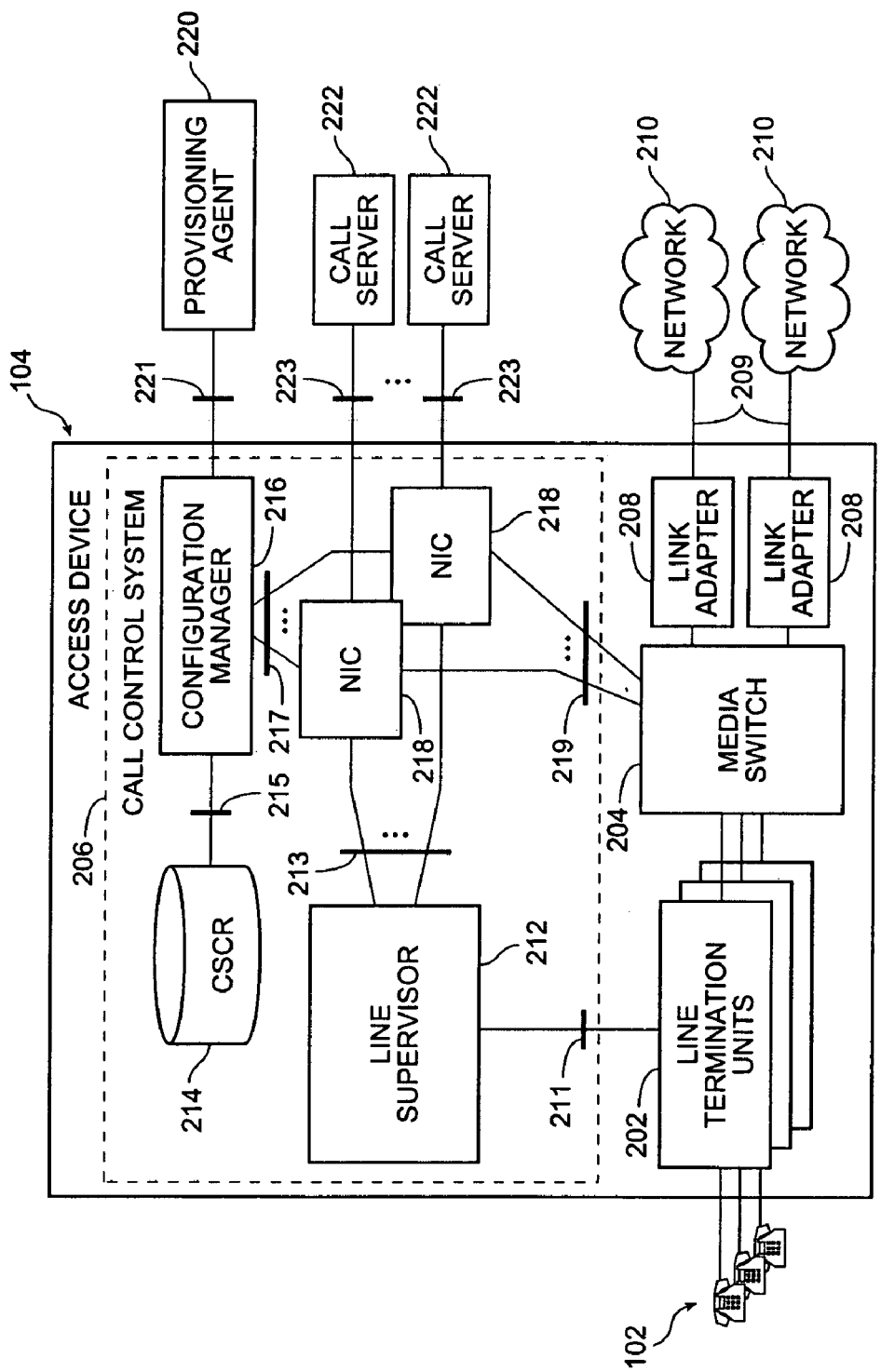
FIG. 2 is a detailed block diagram of the access device illustrated in FIG. 1.

Referring to FIG. 2, a more detailed diagram of the access device 104 is illustrated. The access device includes a plurality of line termination units 202, a media switch 204, a call control system 206, and a plurality of link adapters 208. The line termination units 202 terminate the signals from the endpoints 102, as is common in the art. The line termination units 202 are each coupled to the media switch 204. The media switch 204 is coupled to each of the link adapters 208. Each of the links adapters is coupled to a corresponding transport network 210.

The call control system 206 includes a line supervisor 212, a call services configuration repository 214, a configuration manager 216, and a plurality of network interface controllers 218, each of which may be implemented as a combination of hardware, firmware or software components. The line supervisor 212 is coupled to each of the line termination units 202 via an endpoint control interface 211. The line supervisor 212 is further coupled to each of the network interface controllers 218 via a line control interface 213. Each network interface controller 218 is coupled with the media switch 204 and the configuration manager 216 via a switch control interface 219 and an access control interface 217, respectively. Each network interface controller 218 is further coupled to a corresponding call server 222 via a call control interface 223. The configuration manager 216 is further coupled to the call services configuration repository 214 and a provisioning agent 220 via a repository interface 215 and a management interface 221, respectively.

The access device 104 has carrier links 209 to each of the transport networks 210. Each carrier link physically terminates at the link adapter 208 in the access device 104. The link adapters 208 transmit and receive signals and media streams between the access device 104 and the transport networks 110, performing a layer-2 adaptation between the media switch 204 and the carrier links 209. The link adapters 208 use different carrier technologies, including time-division multiplexing (TDM), asynchronous transfer mode (ATM), synchronous optical network (SONET), Ethernet, and the like, depending on the transport network to which it is connected, as will be appreciated by a person skilled in the art.

The line terminations units 202 comprise hardware, firmware and software elements for providing the physical interface to the endpoints 102. A line, in the present context, comprises a communications path to individual endpoint equipment over which media and control signals are received and transmitted. Each line may consist of a separate physical link between the endpoint equipment 102 and the access device 104. Alternatively, lines from multiple endpoints may be aggregated in front of the access device 104, and then transported over a multiplexed link to the access device. In the latter case, the lines are de-multiplexed before they are fed to their respective line terminations units 202.

The line terminations units 202 further include signal processing resources and functions required for coupling the endpoints 102 with the supported networks 210 and carrying the media stream across the media switch 204. These signal processing resources include analog/digital converters, payload encoders/decoders, packetizers, jitter buffers, echo cancellers, tone detectors, tone generators, modems, and the like.

The media switch 204 provides connectivity between the line termination units 202 and the link adaptor 208 for accessing the carrier links 209 to the networks 210. The media switch is able to establish a media stream connection between any line termination unit 202 and any carrier link adapter 208, and supports multiple simultaneous connections. The media switch 204 selectively couples each of the line termination units 102 with a corresponding link adapter 208 in accordance with the configuration of the call control system 206. Thus, the call control system 206 determines the destination for each endpoint on a line-by-line basis. The details of the media switch are known in the art and, thus, need not be described in detail. Any appropriate switching technology, be it standard or proprietary, may be used. ATM and IP are two examples of standard switching technologies that may be used. In an IP switch, priority routing is based on the quality of service attributes of each packet, and packets of equal priority are routed on a First Come/First Served basis. In ATM, routing is based on the traffic descriptor of each virtual circuit through the switch, and ATM cells from circuits of equal priority are routed on a First Come/First Served basis. Switching quality degrades if the aggregate bandwidth of active connections exceeds the bandwidth of the switch.

Each carrier link 209 is used to transport media streams to and from the access device 104. The same carrier links are typically used to transport call control signals to the call servers 222, in which case the call control signals are multiplexed with the media streams. Alternatively, separate carrier links may be dedicated to the transport of call control signals. For clarity the call control interfaces illustrated in FIG. 2 are shown to be separate from the carrier links 209. Further, because call control interfaces are logically independent from transport networks, it is possible for multiple call servers to use the same transport network to provide their call services. Thus, a transport network 210 may carry control signaling from multiple call servers 222 to the same access device 104.

The call server 222 is a network entity that provides control logic and signaling for establishing media paths between endpoints. In conventional telephony networks, call servers are typically responsible for administration functions such as call traffic measurement and billing. Examples of call servers include conventional local exchange PSTN switches as well as next-generation call controllers, referred to as softswitches.

The call server 222 determines a call control protocol to be used at its interface 223 with the access device 104. Conventional local exchange switches, which use TDM carrier links, use control protocols including SS7, TR-08 or GR-303, and the like. Next-generation packet-based call servers use peer signaling protocols including H.323, SIP, master-slave control protocols such as MGCP and MEGACO/H.248, and the like.

The design of the interfaces between components in the call control system is such that it allows the components to be physically contained in separate units. Thus the call control system can be implemented as a single device, or it can be implemented as a distributed access device, wherein the units are interconnected by intervening communication links or networks.

Figure 3:
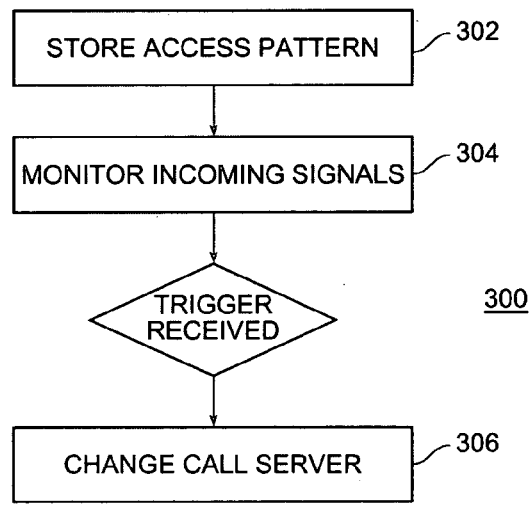
FIG. 3 is a flow chart illustrating the operation of the access device.

Referring to FIG. 3, a flow chart illustrating the general functionality of the access circuit is illustrated generally by numeral 300. At step 302, the access device stores an access pattern identifying a plurality of call servers. The access pattern further defines trigger events for each of the subscribers and each of the transport networks. One of the call servers provides initial service to the subscriber. At step 304, the access device monitors incoming signals for identifying the trigger events. If one the trigger events is detected, at step 306 control over the subscriber is transferred from the current call server to a different call servers in accordance with said detected trigger event and said access pattern, thus providing the migration as desired.

The functionality of the call control system is described in detail below. The call services configuration repository 214 provides persistent storage for descriptions of provisioned call control interfaces 223, and endpoint subscription information. Each call control interface description provides the network coordinates of an associated call server 222, a set of carrier links 209 to use for the call services offered by this server, and the parameters of the call control protocol to use on this interface. The subscription information for an endpoint specifies an access pattern which identifies the call server or plurality of call servers that are capable of providing service to the endpoint. The access pattern indicates which of the call servers 222 initially provides service to the endpoint, and defines events that, when they occur, trigger a transition to a different call server. An endpoint may be left in an unprovisioned state, where it does not subscribe to any call service.

The configuration manager 216 maintains the contents of the repository 214 and provides an interface 221 for an external provisioning agent 220 to access the repository. This interface 221 allows the provisioning agent 220 to define, modify, remove, enable or disable call control interfaces, add or remove endpoint subscriptions, and query parameters or service states of a call control interface or endpoint.

At system initialisation, the configuration manager 216 retrieves the list of provisioned call control interfaces 223 from the call services configuration repository 214 and for each interface starts a network interface controller 218 with the parameters of the interface. The network interface controller 218 then proceeds to initialise the carrier links for the interface, and attempts to contact its call server 222. The call control interface 223 becomes active when the call server 222 and corresponding network interface controller 218 begin exchanging call control signals. The network interface controller 218 notifies the configuration manager 216 when its interface becomes active.

Upon activation of a call control interface 223, the configuration manager 216 retrieves a list of endpoint subscription information for the interface from the call services configuration repository 214. The configuration manager 216 provides the endpoint list to the corresponding network interface controller 218. For each endpoint in the list, the configuration manager indicates to the corresponding network interface controller 218 whether it should immediately resume service to this endpoint, as per the access pattern provisioned for the endpoint. The configuration manager also indicates access trigger events that should be reported to the configuration manager whenever they occur. Access trigger events include, but are not limited to, failure of the call server or intervening transport network, transport network congestion, and commands entered by the subscriber at the endpoint. Such command invocations may consist of strings of dialled digits or other inputs from the subscriber.

Depending on the call control protocol in effect on an interface 223, the network interface controller performs different functions that may include any combination of the following. It notifies the call server 222 with any change in the operational state of an endpoint that subscribes to its call services, for example whether it is in or out of service. It signals to the call server 222 any endpoint event requested by the call server 222, or any endpoint event whose notification is designated as mandatory by the call control protocol. Such endpoint events include handsets being taken off hook or being put on hook, buttons being pressed and released, and the like. Further, it signals the line supervisor 212 for allocating and configuring line termination units 202, as required to perform the call services requested from the call server 222. The network interface controller further establishes and removes connections in the media switch 204 between line terminations units 202 and link adapters 208 for performing call services as directed by the associated call server 222.

The line supervisor 212 is coupled via the endpoint control interfaces 211 to every line termination unit 202 and provides the functions necessary for network interface controllers to direct line terminations and endpoints to implement call services. This includes, without being limited to, the following functions. Registering which of the network interface controllers 218 require notification of an endpoint's events. Signaling to the registered network interface controllers 218 any change in the operational state of an endpoint or its line termination unit 202, for example whether it is in or out of service. Signaling endpoint events, as described above, to the registered network interface controllers 218. Reporting to the registered network interface controllers 218 the detection of audio signals injected in the media stream by or through the endpoint towards the access device such as keypad input, modem or fax tones. Reporting to the registered network interface controllers 218 the detection of audio signals injected by or through the network towards the endpoint, such as ringing, alerting, recording, busy or "out-of-order" tones and the like. Controlling elements of an endpoint's user interface through a line termination unit. This includes activating an audible signal, displaying a message, lighting or flashing a lamp, playing a tone or pre-recorded message, and the like. The line supervisor also configures and activates or deactivates media processing functions in an endpoint or its line termination unit for the purpose of connecting or disconnecting a call.

The network interface controller notifies the configuration manager whenever it observes one of the requested access trigger events. The configuration manager then consults the, access pattern of the endpoint for which the event occurred, and modifies its access association accordingly. To modify the access association of an endpoint, the configuration manager notifies the current network interface controller to suspend service to the endpoint. The configuration manager then notifies the new network interface controller to resume service to the endpoint, in effect to gracefully take over control of the endpoint, and thus transferring the endpoint to a different call server.

Thus it can be seen that the access device architecture described herein provides a flexible system for allowing subscriber loops to migrate gracefully between networks on a line-by-line basis. That is, each line can be independently provisioned by either the user or a system operation for providing a connection to a desired network. For example, if a subscriber receives service on a TDM network but wishes to change to a packet based system, the subscriber can change the service simply by issuing one of the predefined trigger events, such as dialling a predefined sequence. Alternately, the subscriber can contact a system operator who can program the transition to occur on a call server.

Yet further, it can be seen that the access device architecture described herein provides a flexible system for allowing subscriber loops to migrate gracefully between networks dynamically, on a call-by-call basis. That is, each line can be independently provisioned either automatically or by the user for providing a connection to a desired network. For example, data modem calls can be automatically detected and routed over the packet network to reduce the load on the TDM network. In another example, subscribers are able to switch to a different call service provider to take advantage of lower rates. In yet another example, a subscriber line is automatically switched to a different transport network upon failure or congestion of their usual network. These and other embodiments will become apparent to a person skilled in the art. Thus it can be seen that the invention enables the graceful migration of voice services from legacy equipment to a next-generation network.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. An access device in a telecommunications network for coupling each of a plurality of subscriber loops to any of a plurality of transport networks, said access device comprising:
   (a) a plurality of line termination units for coupling said plurality of subscriber loops with said access device;
   (b) a plurality of link adaptors for coupling said plurality of transport networks with said access device;
   (c) a media switch for selectively coupling ones of said plurality of line termination units with ones of said link adaptors; and
   (d) a call control system for controlling said media switch for determining which of said plurality of line termination units is coupled with which of said link adaptors and for providing call control between said plurality of subscriber loops and said plurality of transport networks associated therewith.

2. An access device as defined in claim 1, wherein said call control system further includes a memory for storing call service configuration provided by said access device.

3. An access device as defined in claim 2, wherein said call service configuration includes descriptions of call control interfaces that are provisioned and subscriber loop subscription information.

4. An access device as defined in claim 3, wherein said subscriber loop subscription information includes a description of an access pattern specifying transitions between said call control interfaces and events that trigger said transitions.

5. An access device as defined in claim 4, wherein said call control system further includes a configuration manager for managing contents of said memory.

6. An access device as defined in claim 5, wherein said configuration manager determines which call control interface provides call services to each of said subscriber loops at any point in time.

7. An access device as defined in claim 5, wherein said call control system further includes a provisioning interface for coupling to a provisioning agent to provide external access to said configuration manager.

8. An access device as defined in claim 7, wherein said provisioning interface allows said provisioning agent to define, modify, remove, enable, and disable call control interfaces and subscriber loop subscriptions.

9. An access device as defined in claim 5, wherein said call control system further includes a plurality of network interface controllers, each of said network interface controllers corresponding to an associated subscriber loop for controlling said media switch and providing said call control between said plurality of subscriber loops and associated call servers.

10. An access device as defined in claim 9, wherein said network interface controllers watch for, detect and report access triggers to said configuration manager.

11. An access device as defined in claim 10, wherein said configuration manager changes said network interface controller associated with said customer loop upon occurrence of said access triggers in accordance with said access pattern provisioned for said customer loop.

12. An access device as defined in claim 9, wherein the call server is a softswitch.

13. An access device as defined in claim 9, wherein the call server is a public switched telephone network switch.

14. An access device as defined in claim 9, wherein said call control system further includes a line supervisor for allocating and configuring said line termination units and for call control notifications between said plurality of line termination units and their associated network interface controller.

15. An access device as defined in claim 1, wherein a bandwidth of said media switch is greater than an aggregate bandwidth of connections through said media switch.

16. An access device as defined in claim 1, wherein said call control is communicated to an associated call server by multiplexing call control signals with media signals and transmitting them over a common link.

17. An access device as defined in claim 16, wherein multiple call control signals are transmitted across a single link.

18. An access device as defined in claim 1, wherein said call control is communicated to an associated call server by a link separate from a link transmitting media signals.

19. An access device as defined in claim 18, wherein multiple call control signals are transmitted across a single link.

20. A method for allowing a subscriber to migrate between services, said subscriber being coupled with at least one transport network via an access device, said method comprising the steps of:
   (a) storing at said access device an access pattern identifying a plurality of call servers, one of said call servers for providing initial service to said subscriber, said access pattern further defining trigger events;
   (b) monitoring at said access device for said trigger events; and
   (c) transferring control over said subscriber, upon detection of at least one of said trigger events, to a different one of said plurality of call servers in accordance with said detected trigger event and said access pattern.

21. A method as defined in claim 20 wherein different call servers utilize different transport networks.

22. A method as defined in claim 20, wherein said migration occurs between calls.

23. A method as defined in claim 22, wherein said subscriber initiates said migration.

24. A method as defined in claim 22, wherein a system operator initiates said migration.

25. A method as defined in claim 20, wherein said migration occurs during calls.

26. A method as defined in claim 25, wherein said subscriber initiates said migration.

27. A method as defined in claim 25, wherein a system operator initiates said migration.

28. A method as defined in claim 25, wherein a said migration is initiated by a predefined event.

* * * * *